W. B. GERVAIS & M. GILMORE.
FIRE DOOR.
APPLICATION FILED MAR. 17, 1913.
1,087,577.
Patented Feb. 17, 1914.
2 SHEETS—SHEET 2.
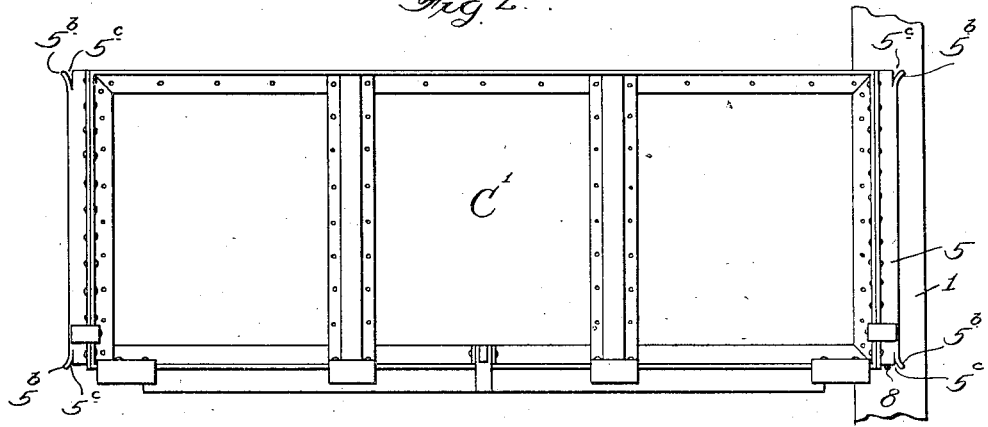
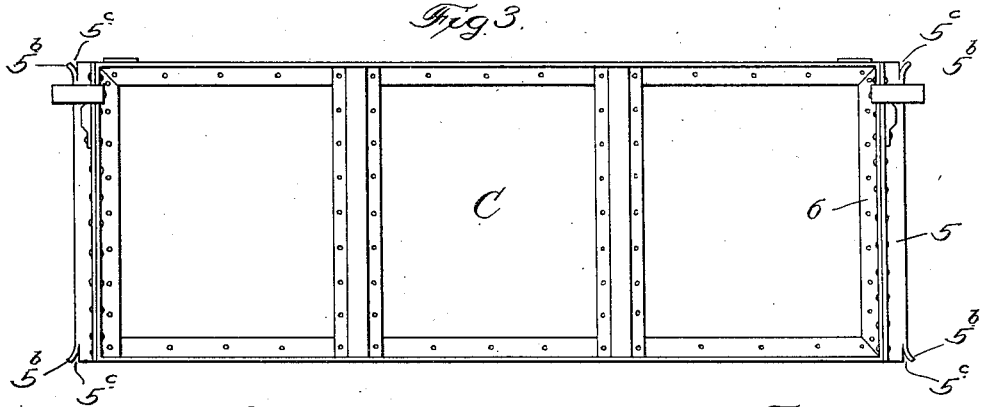
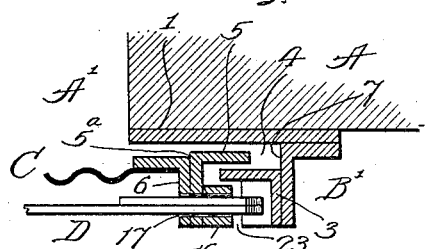
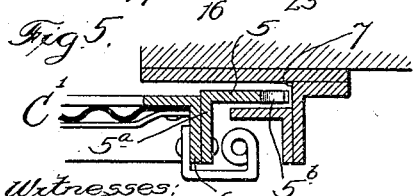
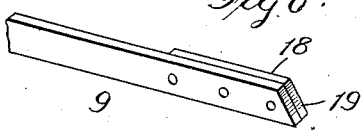
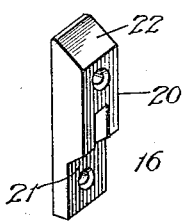
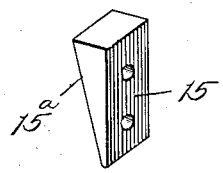

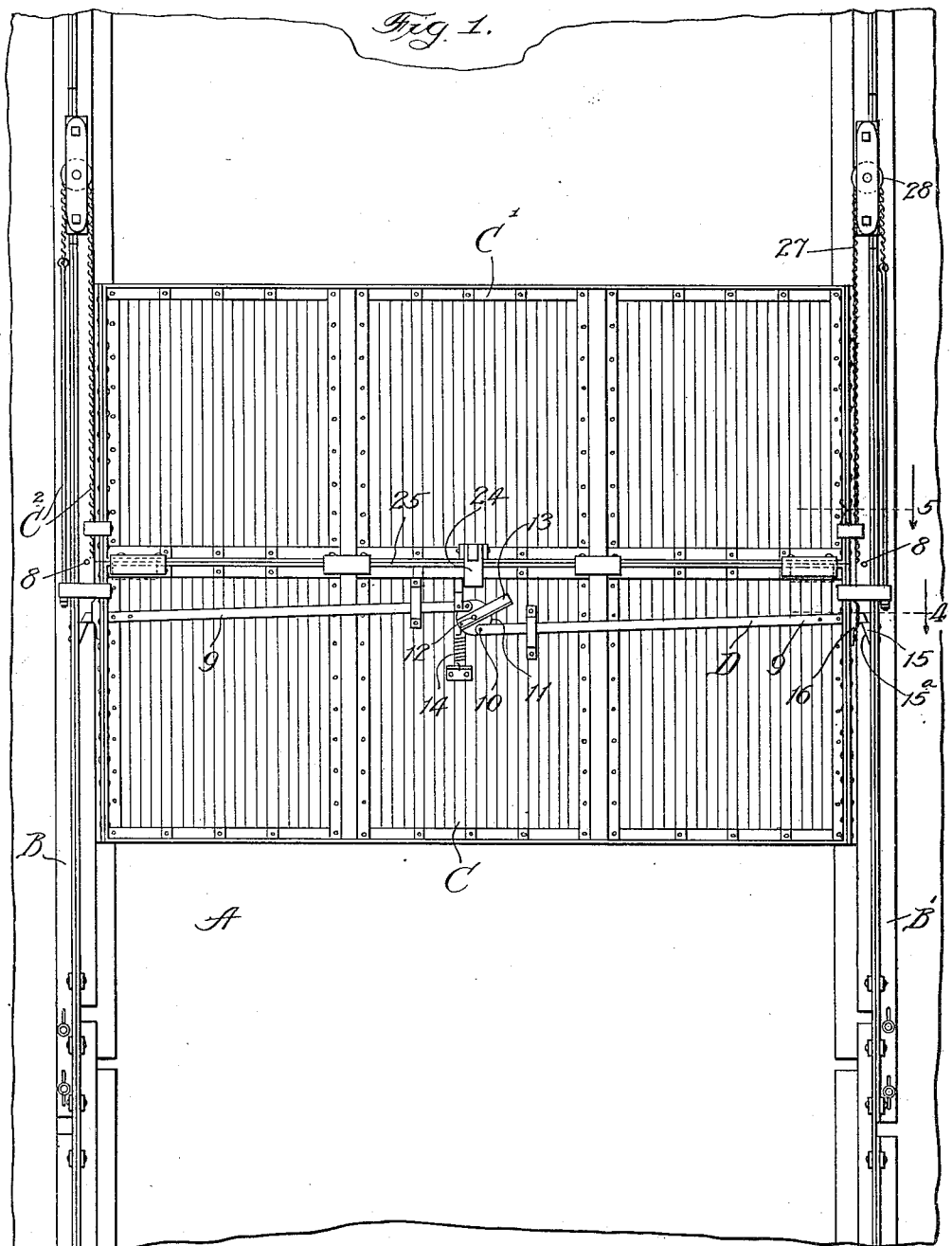

UNITED STATES PATENT OFFICE.

WAINWRIGHT B. GERVAIS AND MILLARD GILMORE, OF CHICAGO, ILLINOIS, ASSIGNORS TO VARIETY MANUFACTURING COMPANY, OF CHICAGO, ILLINOIS.

FIRE-DOOR.

1,087,577.  Specification of Letters Patent.  Patented Feb. 17, 1914.

Original application filed September 9, 1912, Serial No. 719,343. Divided and this application filed March 17, 1913. Serial No. 754,760.

*To all whom it may concern:*

Be it known that we, WAINWRIGHT B. GERVAIS and MILLARD GILMORE, citizens of the United States, residing at Chicago, in the county of Cook and State of Illinois, have invented new and useful Improvements in Fire-Doors, of which the following is a specification.

This invention relates particularly to fire-doors of the type in which upper and lower door-sections are adapted to counterbalance each other. Such doors are especially useful in connection with the shafts of freight elevators.

The primary object of the invention is to provide heat controlled devices at the lateral edges of the door-sections and associated with the door-sections and vertical guides for the lateral edges thereof, whereby the necessary movement of the door-sections will be permitted under varying conditions, and the lower door-section especially will be securely fastened in its elevated position, that is when the door-sections are closed.

The present application constitutes a division of our application No. 719,343, filed September 9, 1912.

The invention is illustrated in the preferred embodiment in the accompanying drawings, in which—

Figure 1 represents an inner broken elevational view of the wall of an elevator-shaft having a door-opening closed by a fire-door constructed in accordance with our improvements; Fig. 2, a view of the upper door-section employed; Fig. 3, a view of the lower door-section employed; Fig. 4, a broken sectional view taken as indicated at line 4 of Fig. 1, showing a portion of the latch-device employed; Fig. 5, a broken sectional view taken as indicated at line 5 of Fig. 1, this view showing one of the lateral bearings of the door-section; Fig. 6, a broken perspective view of one of the latch-bars employed; Fig. 7, a perspective view of one of the safety-stops or supports with which the lower door-section is equipped; and Fig. 8, a perspective view of a co-acting stop with which the door-guide is equipped.

In the construction illustrated, A represents the wall of an elevator-shaft provided with a door-opening A' (Fig. 4); B, B', vertical guides connected with the inner surface of the wall A and extending along the lateral margins of the door-opening; C, C', lower and upper door-sections, respectively, movable in the guides B, B', said lower and upper door-sections being joined by connections $C^2$, whereby said sections serve to counterbalance each other in that well understood manner; and D, latching or locking mechanism connected with the lower door-section.

The wall construction A may be of any approved type. Each of the guides B, B' preferably comprises a wall-plate 1 applied to the inner face of the wall; an angle-bar 2 secured to the bar 1; and an angle-bar 3 secured to the outstanding flange of the angle-bar 2, the parts being so arranged as to afford a guide-groove 4 for the lateral flanges 5 of the door-sections. The lateral flanges 5 of the door-sections are preferably provided by applying angle-bars $5^a$ to the outstanding flanges of the lateral marginal angle-bars 6 with which the bodies of the door-sections are equipped. Each flange 5 is cut or split at its upper and lower ends and the metal is bent outwardly to form a tongue or bearing $5^b$ which is adapted to co-act with the wall 7 of the groove 4. Thus, there is provided a tongue or member $5^b$ at each corner of each door-section. These members are adapted to prevent racking of the door-section in operation. Each vertically severed member $5^b$ is separated from the body of the flange of which it forms a part by a space $5^c$, so that in case of undue expansion of the door, the members will yield, thus preventing the door from binding in its guides. It is preferred to equip the guides B, B' with studs or stumps 8, which are adapted to limit the downward movement of the door-section C'.

The flanges 5 of the upper door-section are recessed or cut away slightly at their lower ends to accommodate the stops and afford shoulders adapted to rest upon said stops. The latch mechanism D preferably comprises a pair of latch-bars 9 whose inner ends are connected by pivots 10 with a centrally-located disk 11 which is connected, by a pivot 12, to the central upper portion of the lower door-section; a handle 13 fixedly secured to the disk 11; a spring 14 adapted to rotate the disk to a position in which the latch-bars are in the locking position; stops 15 with which the guides B, B' are equipped; and stops 16 with which the lateral edges of the lower door-section are equipped at their upper portions. The stops 16 are normally inoperative, but are adapted to engage the stops 15 in case of undue expansion of the door, as in the event of fire. The stops 16 are secured to the outstanding flanges of the angle-bars 5ª, being disposed near the upper corners of the lower door-section; and said stops 16 and the outstanding flanges of the angle-bars 5ª and 6 are provided with perforations or slots 17 through which the upper ends of the latch-bars 9 extend, said perforations thus serving as guides for the latch-bars. The latch-bars are provided at their upper ends with reinforcing members 18. The ends of the latch-bars are preferably beveled upwardly, as indicated at 19, to enable them to readily pass the stops 15, which are beveled, as indicated at 15ª. The stops 16 are provided on their outer sides with projections 20 which have bevels 21 and 22 at their lower and upper ends, respectively, the purpose of the bevel being to enable the stops 16 to readily pass the stops 15 in the operation of the closing and opening of door, even though the door should be racked somewhat from its proper position. In the event of undue expansion of the door, however, the projections 20 will overlie the stops 15, thus insuring the lower door-section against dropping, regardless of the latch-mechanism D. It is to be noted, further, that in the normal condition of the door the member 16 is disposed very close to the stop 15, so that there is only a slight space 23 (Fig. 4) to be bridged by the latch-bar. The purpose of this arrangement is to avoid the danger of the latch-bar bending under the weight of the door-section. In other words, the arrangement is such as to place a shearing action upon the latch-bars rather than to give opportunity for bending movement. This insures greater safety to the door and up till the time that the stop 16 reliably engages the stop 15, owing to the expansion of the door.

The drawings illustrate a latch-member 24 carried by the lower central portion of the upper door-section and adapted to lockingly engage a flange 25 at the upper margin of the lower door-section. This latch-member 24 is adapted to be released by a cam 26 carried by one of the latch-bars 9. This is mentioned by way of explanation, as this centrally latched device forms no part of the invention sought to be secured in the present application. The counterbalancing connections C² include chains 27 which pass over rollers 28 carried by guides B, B'.

The foregoing detailed description has been given for clearness of understanding, and no unnecessary limitations should be understood therefrom.

What we regard as new and desire to secure by Letters Patent is:—

1. In a door of the character set forth, the combination of a pair of guides equipped with stops, upper and lower metallic door-sections movable in said guides, stops carried by the upper portions of the lateral edges of the lower door-section and disposed normally above and out of engagement with but closely adjacent said first-named stops, and a latch device adapted to support the lower door-section in the normal condition of the door.

2. In a door of the character set forth, the combination of a pair of guides, upper and lower metallic door-sections movable in said guides and connected together to counterbalance each other, stops carried by said guides, normally inoperative stops above and adjacent thereto and carried by the lower door-section, and latch-bars carried by the lower door-section and extending through said second-named stops and engaging said first-named stops.

3. In a door of the character set forth, the combination of a pair of guides, upper and lower metallic door-sections movable therein and connected together to counterbalance each other, stops carried by said guides, normally inoperative stops carried by the lower door-section and disposed above said first-named stops and having projections provided with beveled upper and lower surfaces, said last-named stops having slots therethrough, and latch-members carried by the lower door-section and extending through said slots and normally engaging said first-named stops when the door is in closed position.

4. In a door of the character set forth, the combination of a pair of guides equipped with stops, upper and lower metallic door-sections movable in said guides, members carried by the upper portions of the lateral edges of the lower door-section and disposed normally close to said stops, said members having perforations therethrough and latch-members extending through said perforations and coacting with said stops to support the lower door-section in its closed position, said second named stops adapted to engage said first-named stops upon expansion of the lower door-section.

5. In a door of the character set forth, the combination of a pair of guides provided with grooves, upper and lower door-sections movable in said guides, the lower door-section being metallic and having its lateral margins equipped with angle-bars having outstanding flanges and equipped also with angle-bars carried by said outstanding flanges and engaging said grooves, stops carried by said guides, stops carried by said last-named angle-bars and disposed adjacent said first-named stops, said angle-bars and said members having slots therethrough, and latch-members extending through said slots and co-acting with said stops and serving to support the lower door-section in its closed position, said stops adapted to engage when the lower door-section expands.

6. The combination of a pair of vertical guides, stops carried thereby, and a metallic door-section movable in said guides and equipped with stops adapted to be thrown into engagement with said first-named stops when the door-section expands, whereby said stops will serve to secure the door-section against falling when an abnormally high temperature occurs.

7. In a door of the character set forth, the combination of a pair of guides equipped with stops, upper and lower door sections movable in said guides, stops carried by the upper portions of the lateral edges of the lower door-section and normally out of engagement with said first-named stops, but so disposed with relation thereto that the second-named stops will be forced into engagement with the first-named stops in case of undue expansion of the door, and latch members adapted to support the lower door-section in the normal condition of the door.

WAINWRIGHT B. GERVAIS.
MILLARD GILMORE.

In presence of—
L. HEISLAR,
J. LANDESMAN.

Copies of this patent may be obtained for five cents each, by addressing the "Commissioner of Patents, Washington, D. C."